United States Patent
Seo

(10) Patent No.: US 12,360,737 B2
(45) Date of Patent: Jul. 15, 2025

(54) DISPLAY DEVICE AND OPERATING METHOD THEREOF

(71) Applicant: LG ELECTRONICS INC., Seoul (KR)

(72) Inventor: Gwanhui Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 307 days.

(21) Appl. No.: 18/060,194

(22) Filed: Nov. 30, 2022

(65) Prior Publication Data

US 2024/0061645 A1    Feb. 22, 2024

(30) Foreign Application Priority Data

Aug. 18, 2022 (KR) .................. 10-2022-0103030

(51) Int. Cl.
*G06F 3/16* (2006.01)
*H04R 3/00* (2006.01)
*H04W 4/80* (2018.01)

(52) U.S. Cl.
CPC ............ *G06F 3/167* (2013.01); *H04R 3/005* (2013.01); *H04W 4/80* (2018.02); *H04R 2420/07* (2013.01)

(58) Field of Classification Search
CPC .................................. G10L 15/32; G06F 3/167
See application file for complete search history.

(56) References Cited

U.S. PATENT DOCUMENTS 10,374,816 B1 * 8/2019 Leblang .............. H04L 12/1822
10,629,199 B1   4/2020 Parthasarathy et al.
(Continued)

FOREIGN PATENT DOCUMENTS

CN     102262879      11/2011
KR   1020140135569    11/2014
(Continued)

OTHER PUBLICATIONS

Prtvar, Bojan, et al. "Voice over BLE case study: Using bluetooth LE remote controller inside Google's Voice search framework." 2015 IEEE 5th International Conference on Consumer Electronics—Berlin (ICCE—Berlin). IEEE, 2015. (Year: 2015).*

(Continued)

*Primary Examiner* — Brian L Albertalli
(74) *Attorney, Agent, or Firm* — LEE, HONG, DEGERMAN, KANG & WAIMEY

(57) ABSTRACT

Provided are a display device capable of processing a plurality of voice commands requested from a plurality of wireless sound devices, and an operating method thereof. The display device includes: a communication unit communicatively connected to a plurality of wireless sound devices; a voice acquisition unit configured to acquire a voice command requested from the plurality of wireless sound devices; and a processor configured to process the voice command, wherein the processor is configured to: perform communication connection to the plurality of wireless sound devices; when a voice transmission request is received from the plurality of wireless sound devices, identify the wireless sound devices based on addresses of the wireless sound devices; and determine a voice command processing sequence for the plurality of wireless sound devices based on a time sequence of the voice transmission request.

19 Claims, 16 Drawing Sheets

(56) References Cited

U.S. PATENT DOCUMENTS

| | | | | |
|---|---|---|---|---|
| 11,295,743 | B1* | 4/2022 | Bumberger | G10L 15/02 |
| 2015/0364143 | A1* | 12/2015 | Abildgren | H04R 5/04 |
| | | | | 381/23 |
| 2018/0317270 | A1* | 11/2018 | Sakamoto | H04W 4/80 |
| 2019/0215879 | A1* | 7/2019 | Song | G10L 15/22 |
| 2019/0260413 | A1* | 8/2019 | Medapalli | H04B 1/40 |
| 2020/0184977 | A1* | 6/2020 | Song | H04W 4/80 |
| 2020/0275250 | A1 | 8/2020 | Choi et al. | |
| 2021/0056969 | A1 | 2/2021 | Yun | |
| 2022/0068271 | A1* | 3/2022 | Berg | G10L 15/26 |
| 2022/0256286 | A1* | 8/2022 | Gu | H04W 72/0446 |
| 2022/0262371 | A1* | 8/2022 | Kathpal | H04L 51/18 |
| 2022/0319507 | A1* | 10/2022 | Jung | G10L 25/84 |

FOREIGN PATENT DOCUMENTS

| | | |
|---|---|---|
| KR | 1020180135595 | 12/2018 |
| KR | 1020200141839 | 12/2020 |

OTHER PUBLICATIONS

Gentili, Maurizio, Roberto Sannino, and Matteo Petracca. "Bluevoice: voice communications over bluetooth low energy in the internet of things scenario." Computer Communications 89 (2016): 51-59. (Year: 2016).*

Korean Intellectual Property Office Application No. 10-2022-0103030, Office Action dated Apr. 8, 2024, 4 pages.

European Patent Office Application Serial No. 22210058.8, Search Report dated Aug. 18, 2023, 3 pages.

* cited by examiner

DISPLAY DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2022-0103030, filed on Aug. 18, 2022, the contents of which are hereby incorporated by reference herein in their entirety.

BACKGROUND

The present disclosure relates to a display device capable of processing a plurality of voice commands requested from a plurality of wireless sound devices, and an operating method thereof.

In general, a display device is a device having a function of receiving, processing, and displaying an image that can be viewed by a user. A display device receives a broadcast signal selected by a user among broadcast signals transmitted from a broadcast station, separates an image signal from the received broadcast signal, and displays the separated image signal on a display.

Recently, due to the development of broadcasting technology and network technology, the functions of display devices have been diversified considerably, and the performance of display devices has been improved accordingly. That is, display devices have been developed to provide not only broadcast content but also various other content to users.

For example, display devices may provide not only programs received from a broadcasting station but also game play, music listening, Internet shopping, user customized information, and the like by using various applications. In order to perform these extended functions, display devices may be basically connected to other devices or networks by using various communication protocols, and may provide ubiquitous computing environments to users. That is, display devices have evolved into smart devices that enable connectivity to a network and ubiquitous computing.

On the other hand, display devices are connected to wireless sound devices to support audio and voice recognition functions.

However, when a plurality of wireless sound devices are connected to a display device, voice recognition is possible for one wireless sound device, but there is a problem in that voice recognition cannot be simultaneously performed for a plurality of wireless sound devices.

Therefore, there is a need to develop a display device capable of processing a plurality of voice commands requested from a plurality of wireless sound devices when connected to a plurality of wireless sound devices in the future.

SUMMARY

The present disclosure aims to solve the above problems and other problems.

The present disclosure aims to provide a display device and an operating method thereof, which are capable of processing a plurality of voice commands requested from a plurality of wireless sound devices by identifying the plurality of wireless sound devices based on addresses for the plurality of wireless sound devices and determining a voice command processing sequence for the plurality of wireless sound devices based on a voice transmission request order.

A display device according to an embodiment of the present disclosure includes: a communication unit communicatively connected to a plurality of wireless sound devices; a voice acquisition unit configured to acquire a voice command requested from the plurality of wireless sound devices; and a processor configured to process the voice command, wherein the processor is configured to: perform communication connection to the plurality of wireless sound devices; when a voice transmission request is received from the plurality of wireless sound devices, identify the wireless sound devices based on addresses of the wireless sound devices; and determine a voice command processing sequence for the plurality of wireless sound devices based on a time sequence of the voice transmission request.

An operating method of a display device according to an embodiment of the present disclosure includes: performing communication connection to the plurality of wireless sound devices; receiving a voice transmission request from the plurality of wireless sound devices; identifying the wireless sound devices based on addresses of the wireless sound devices; determining a voice command processing sequence for the plurality of wireless sound devices based on a time sequence of the voice transmission request; receiving a voice command from the plurality of wireless sound devices; and processing the voice command according to the voice command processing sequence.

DETAILED DESCRIPTION OF THE EMBODIMENTS

Figure 1:
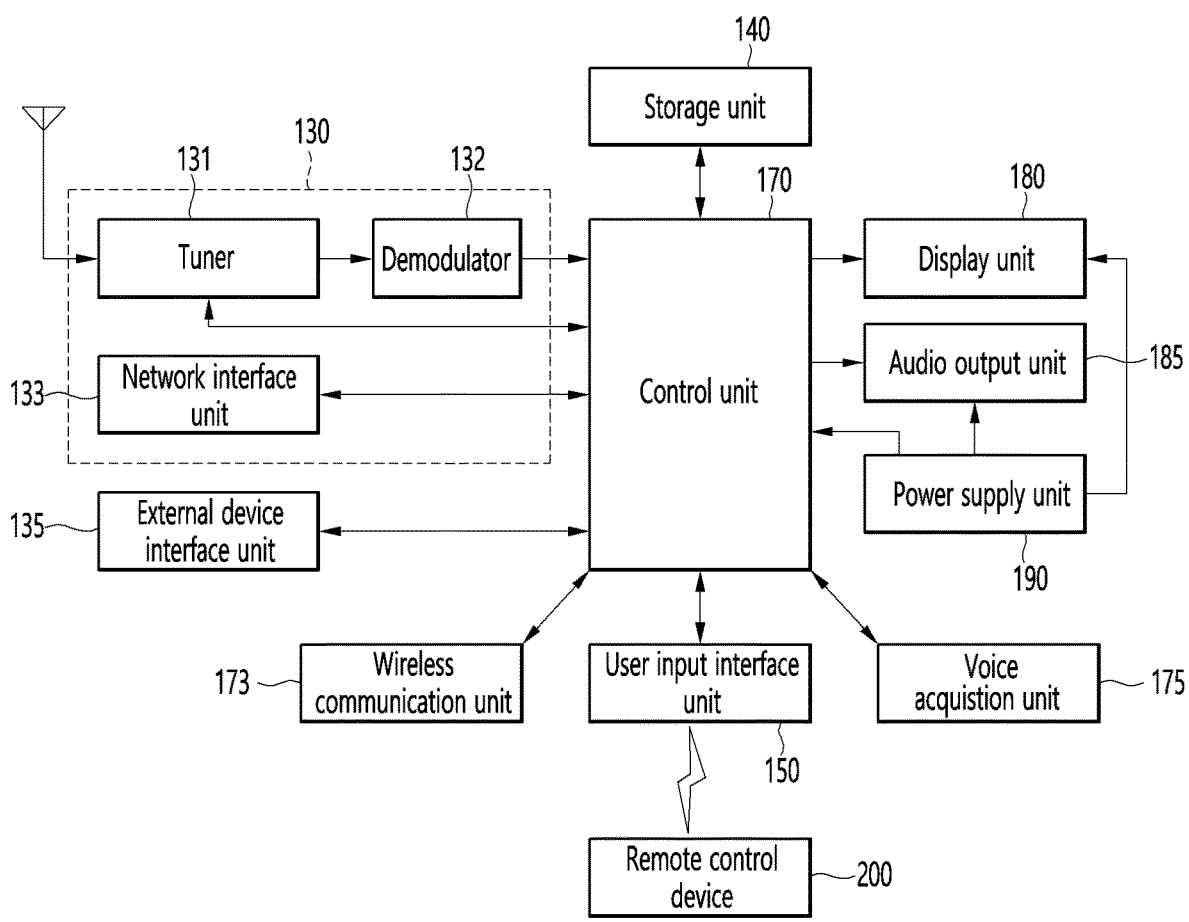
FIG. 1 is a block diagram illustrating a configuration of a display device according to an embodiment of the present disclosure.

Hereinafter, embodiments of the present disclosure are described in detail with reference to accompanying drawings and regardless of the reference symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It will be understood that the present disclosure includes all modifications, equivalents, and substitutes falling within the spirit and scope of various embodiments of the disclosure.

It will be understood that although the terms "first," "second" etc. may be used herein to describe various elements, these elements should not be limited by these terms. These terms are only used to distinguish one element from another.

It will be understood that when an element is "connected" or "coupled" to another element, the element may be directly connected or coupled to the other element or may be "connected" or coupled" to the other element with an intervening element therebetween. On the other hand, it will be understood when an element is "directly connected" or "directly coupled" to another element, no intervening element is present therebetween.

In addition, a neural network and a network function may be used interchangeably throughout this specification. A neural network may be configured with a set of interconnected computational units, which may be generally referred to as "nodes". The "nodes" may also be referred to as "neurons". A neural network is configured to include at least two or more nodes. Nodes (or neurons) constituting neural networks may be interconnected to each other by one or more "links".

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication unit 173, a display unit 180, an audio output unit 185, and a power supply unit 190.

The broadcast reception module 130 may include a tuner 131, a demodulator 132, and a network interface unit 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into an output available form.

The network interface unit 133 may provide an interface for connecting the display device 100 to a wired/wireless network comprising internet network. The network interface unit 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface unit 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulator 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
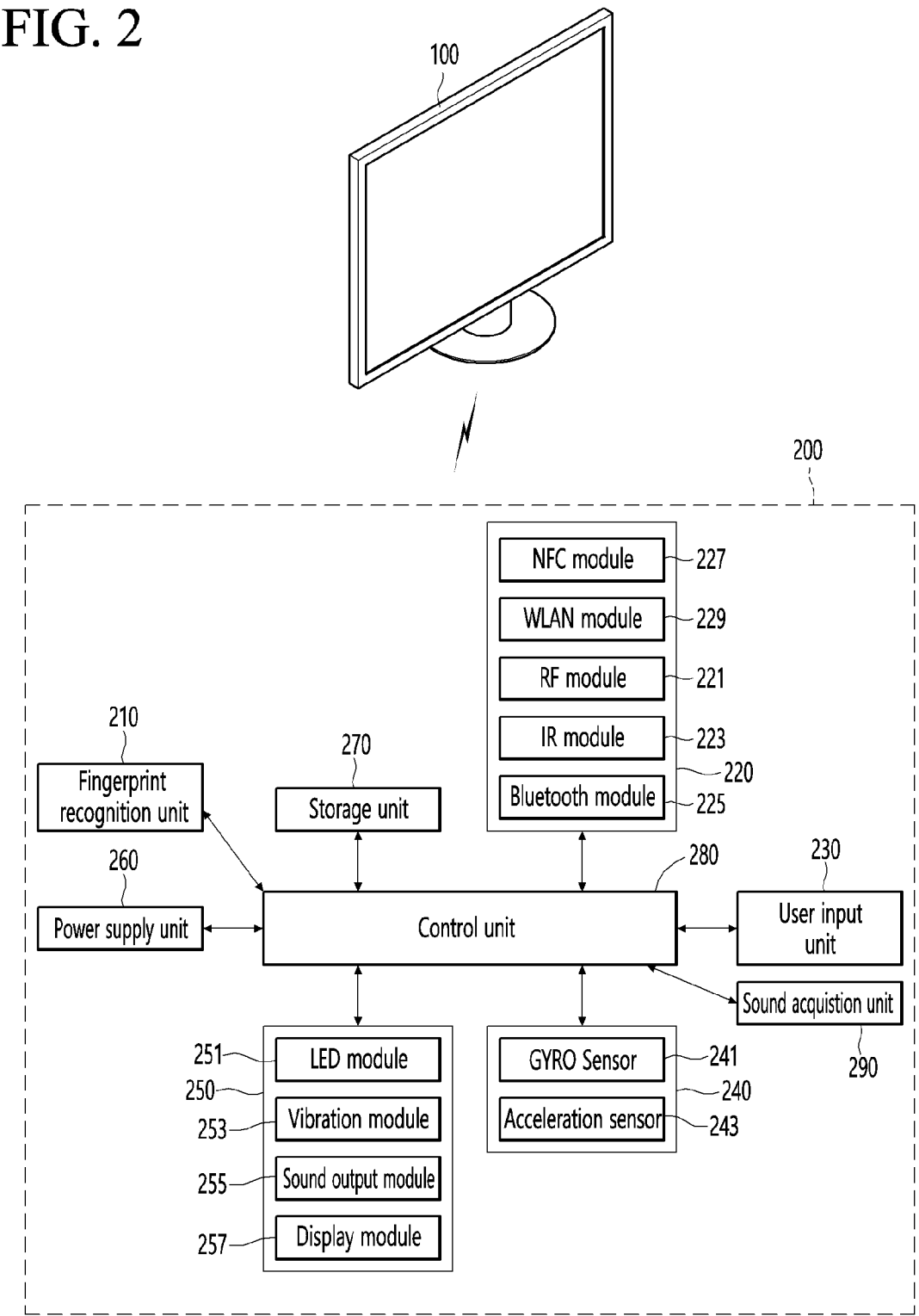
FIG. 2 is a block diagram illustrating a remote control device according to an embodiment of the present disclosure.
Figure 3:
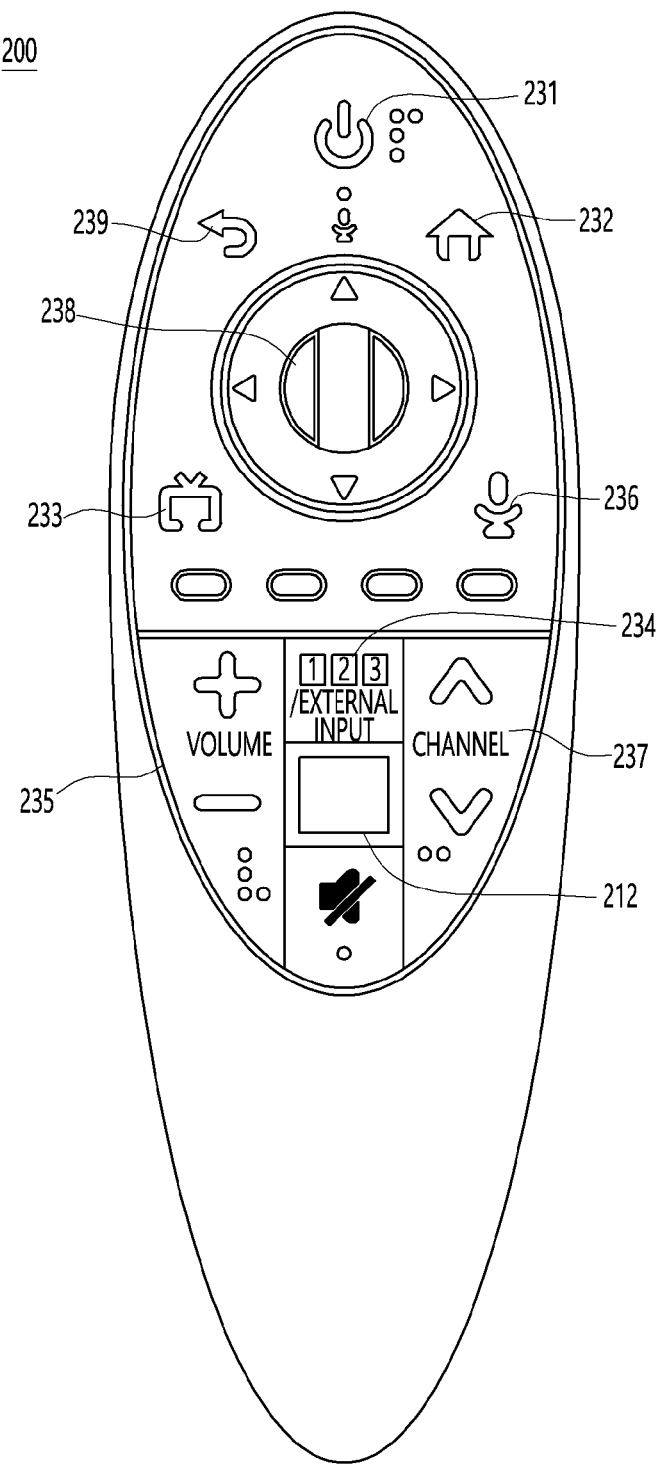
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
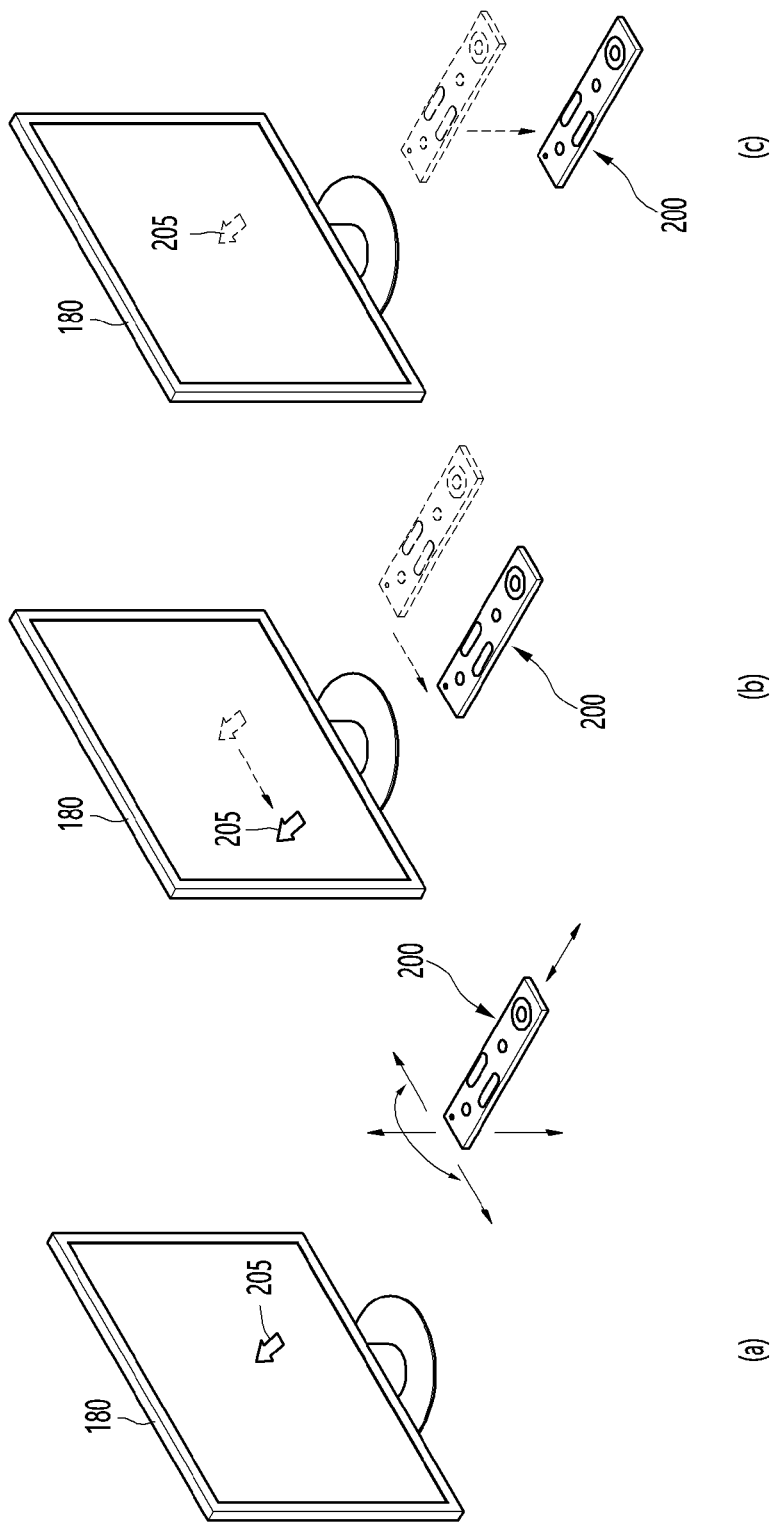
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
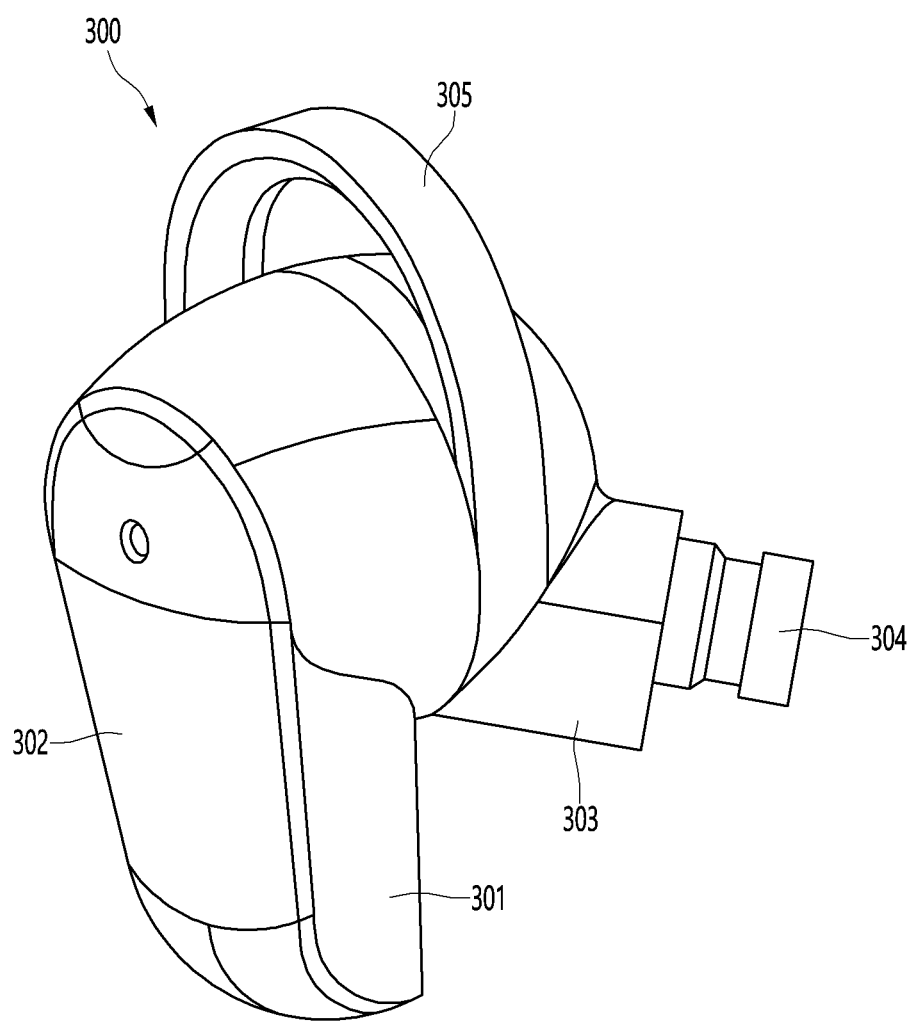
FIG. 5 is a perspective view of a wireless sound device according to an embodiment of the present disclosure.

FIG. 5 is a perspective view of a wireless sound device according to an embodiment of the present disclosure.

A canal-type wireless earphone as a wireless sound device 300 illustrated in FIG. 5 is only an example, and the present disclosure is not limited thereto. That is, the wireless sound device 300 according to the present disclosure may include a headphone, a neckband-type earphone, a canal-type earphone, an open-type earphone, a bone conduction earphone, and the like.

Referring to FIG. 5, the wireless sound device 300 may include a plurality of cases 301, 302, 303, and 305, and the cases 301, 302, 303, and 305 may be coupled to form a housing including an internal space in which electronic components are mounted. The second case 302 coupled to one side of the first case 301 is a portion exposed to the outside when a user wears the wireless sound device 300, and a sound output unit 340 that outputs a sound according to a sound signal is located on the other side of the first case 301, so that a sound passage 304 through which a sound is transferred to the user may be provided. In order to facilitate mounting of components (e.g., the sound output unit 340 and the communication unit 385) in the first case 301, a portion where the sound passage 304 is located may be separated to form a separate case 303.

The wireless sound device 300 is a canal type and includes the sound passage 304 protruding in a form that can be inserted into the user's external auditory meatus, and an ear tip may be coupled to the outside of the sound passage 304 so as to be in close contact with the user's ear.

Figure 6:
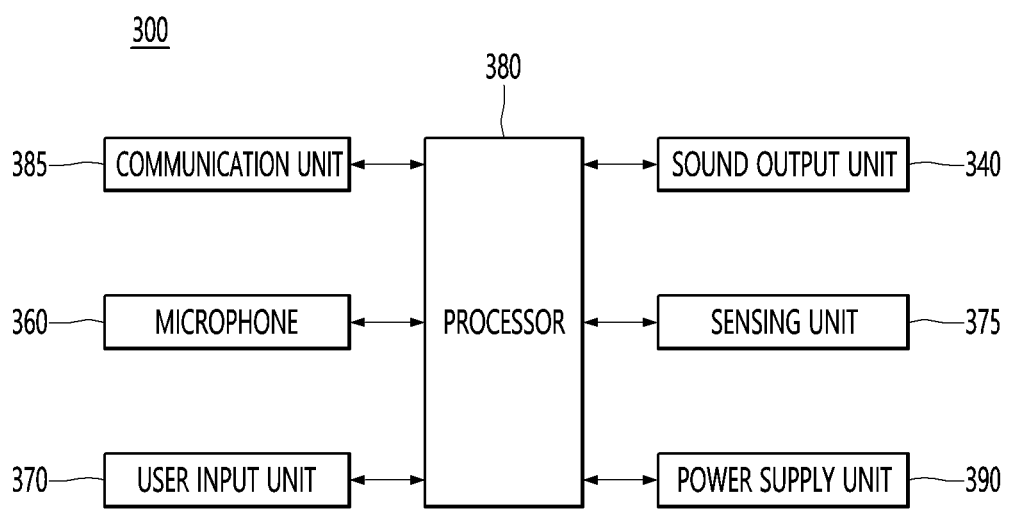
FIG. 6 is a block diagram illustrating a wireless sound device according to an embodiment of the present disclosure.

FIG. 6 is a block diagram illustrating the wireless sound device according to an embodiment of the present disclosure.

Referring to FIG. 6, the wireless sound device 300 may include a processor 380, a communication unit 385, a sound output unit 340, a sensing unit 375, a microphone 360, a user input unit 370, a power supply unit 390, and the like.

The communication unit 385 may transmit and receive data to and from an external device such as the terminal 100 by using a wireless communication technology, and may include an antenna for transmitting and receiving a wireless signal. When the antenna comes into contact with the user's body, the radiation performance decreases. Therefore, the antenna may be positioned in the second case 302 that does not come into contact with the body.

The communication unit 385 may be disposed adjacent to the sound output unit 340. When the wireless sound device 300 includes a plurality of sound output units 340, the communication unit 385 may be configured as many as the number of sound output units 340 and may be respectively disposed adjacent to the sound output units 340. For example, when the wireless sound device 300 includes a first sound output unit and a second sound output unit, a first communication unit may be disposed adjacent to the first sound output unit, and a second communication unit may be disposed adjacent to the second sound output unit.

The sound output unit 340 may include a diaphragm, an acoustic coil, and a permanent magnet that forms a magnetic field around the acoustic coil. When power is applied to the acoustic coil, electromagnetic force may be generated within the magnetic field formed by the permanent magnet to move the acoustic coil, and the diaphragm may vibrate according to the movement of the acoustic coil to output sound.

The microphone 360 processes an external sound signal into electrical voice data. The processed voice data may be transmitted to the terminal 100 or an external server (not illustrated) through the communication unit 385. Various noise cancellation algorithms for canceling noise occurring in a process of receiving an external sound signal may be implemented in the microphone 360.

The user input unit 370 may refer to an input unit or an input interface that allows a user to control the wireless sound device 300. The wireless sound device 300 having a small size may use a touch format or a limited number of buttons to be expanded to control commands that can be input by combining the time and number of times the button is pressed and a plurality of buttons.

The sensing unit 375 may acquire information about the state of the wireless sound device 300 itself and the surrounding conditions. The sensing unit 375 may include an illumination sensor that senses ambient brightness, a touch sensor that senses a touch input, and a gyro sensor or an acceleration sensor that senses the tilt and position of the wireless sound device 300.

The power supply unit 390 supplies power required for the processor 380 and each component and may include a battery. The power supply unit 390 may include a power terminal connected to an external power source in order to charge the battery. In an embodiment, the power terminal may be in contact with a power terminal formed on a cradle on which the wireless sound device 300 is mounted, and may receive power from an external power source.

The processor 380 may control overall operations of the wireless sound device 300.

Figure 7:
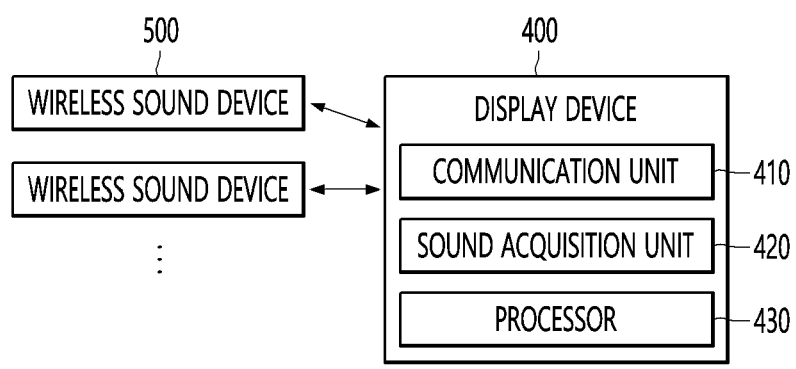
FIG. 7 is a block diagram for describing a display device connected to a plurality of wireless sound devices according to an embodiment of the present disclosure.

FIG. 7 is a block diagram for describing a display device connected to a plurality of wireless sound devices according to an embodiment of the present disclosure.

As illustrated in FIG. 7, the display device 100 may be communicatively connected to a plurality of wireless sound devices 500 to process voice commands for the plurality of wireless sound devices 500.

The display device 100 may include a communication unit 410 that is communicatively connected to the plurality of wireless sound devices 500, a voice acquisition unit 420 that acquires a voice command requested from the plurality of wireless sound devices 500, and a processor 430 that processes the voice command.

The processor 430 may perform communication connection to the plurality of wireless sound devices 500, may identify the wireless sound devices 500 based on addresses of the wireless sound devices 500 when a voice transmission request is received from the wireless sounds devices 500, and may determine a voice command processing sequence for the plurality of wireless sound devices 500 based on a time sequence of the voice transmission request.

In addition, the processor 430 may perform audio connection to the wireless sound devices 500 through a first communication when performing communication connection to the plurality of wireless sound devices 500, and may perform sound connection to the wireless sound devices 500 through a second communication.

For example, the processor 430 may perform audio connection to the wireless sound devices 500 through Bluetooth communication, and may perform voice connection to the wireless sound devices 500 through Bluetooth Low Energy (BLE) communication. This is only an example, and the present disclosure is not limited thereto.

In addition, the processor 430 may provide a guide message indicating that voice command control is possible when voice is connected to the wireless sound device 500 through the second communication.

For example, when providing the guide message, the processor 430 may process the guide message into at least one of text data, voice data, and image data and provide the processed data.

When the guide message is processed into text data, voice data, and image data, the processor 430 may display the text data, audio data, and image data on a display screen of a display device.

In some cases, when the guide message is processed into voice data, the processor 430 may transmit the voice data to the wireless sound device.

Specifically, when performing communication connection to the plurality of wireless sound devices 500, the processor 430 may search for a wireless sound device through the first communication, may perform audio connection to the wireless sound device found through the first communication, may search for a wireless sound device through the second communication, may confirm whether the wireless sound device found through the second communication is an audio-connected wireless sound device, and may perform voice connection to the audio-connected wireless sound device through the second communication when the found wireless sound device is an audio-connected wireless sound device.

The first communication may include Bluetooth communication, and the second communication may include Bluetooth Low Energy (BLE) communication. However, this is only an example and the present disclosure is not limited thereto.

When the voice connection to the audio-connected wireless sound device 500 is completed, the processor 430 may provide a guide message indicating that voice command control is possible.

When a voice transmission request is received, the processor 430 may transmits a voice reception response including a voice start packet to the wireless sound device 500 making a voice transmission request when the voice transmission request including a voice key code packet is received from the wireless sound device 500.

When transmitting the voice reception response, the processor 430 may identify the wireless sound device 500 based on the address and device manager information of the wireless sound device 500 and transmit the voice reception response.

For example, when the voice transmission request is received, the processor 430 may receive the voice transmission request from the wireless sound device 500 through a user input of touching the wireless sound device 500.

When the processor 430 determines the voice command processing sequence, the processor 430 may give priority to the wireless sound device that make the fastest voice transmission request among the plurality of wireless sound devices, and may determine voice command processing sequence so that the voice command of the wireless sound device to which priority is given is processed first.

The processor 430 may block the reception of the voice commands for other wireless sound devices until the processing of the voice command for the wireless sound device to which priority is given is completed.

In addition, when the voice command of the wireless sound device to which priority is given is not recognized, the processor 430 may transmit a voice re-utterance request to the wireless sound device to which priority is given, and block the reception of voice commands for other wireless sound devices.

The processor 430 may block the reception of voice commands for other wireless sound devices until the voice command processing corresponding to the re-utterance of the wireless sound device to which priority is given is completed.

In addition, the processor 430 may provide a voice command processing result for the wireless sound device to which priority is given, and when list information is included in the voice command processing result, may activate the reception of voice commands for the wireless sound devices other than the wireless sound device to which priority is given.

When the voice command is received from other wireless sound devices, the processor 430 may process the voice command with respect to list information included in the voice command processing result.

That is, the processor 430 may process the first voice command of the wireless sound device to which priority is given and provide a first voice command processing result. When list information is included in the voice command processing result, the processor 430 may receive a second voice command of other wireless sound devices, process the second voice command, and provide a second command processing result.

As an example, the second voice command may include a voice command related to list information of the voice command processing result, but this is only an example and the present disclosure is not limited thereto.

For example, the second voice command may include a voice command for selecting a specific item included in the list information of the voice command processing result.

In addition, in a case where the processor 430 performs audio connection and voice connection to a first wireless sound device among a plurality of wireless sound devices and performs audio connection to a second wireless sound device without voice connection, when a voice transmission request is received from the second wireless sound device, the processor 430 may activate a remote voice recognition function and may recognize and process the remote voice command of the second wireless sound device.

When the processor 430 performs only audio connection to the second wireless sound device without voice connection, the processor 430 may provide a guide message indicating that remote voice command control is possible.

For example, when providing the guide message, the processor 430 may process the guide message into at least one of text data, voice data, and image data and provide the processed data.

When the guide message is processed into text data, voice data, and image data, the processor 430 may display the text data, audio data, and image data on a display screen of a display device.

In some cases, when the guide message is processed into voice data, the processor 430 may transmit the voice data to the wireless sound device.

The processor 430 may identify the second wireless sound device based on the address and device manager information of the second wireless sound device and may recognize and process the remote voice command of the second wireless sound device.

When receiving a voice transmission request, the processor 430 may receive the voice transmission request from the second wireless sound device through a user input of touching the second wireless sound device.

In addition, in a case where here is one wireless sound device that performs only audio connection without voice connection among a plurality of wireless sound devices, when the processor 430 receives a voice transmission request from a wireless sound device that performs only audio connection, the processor 430 may activate a remote voice recognition function and may recognize and process a remote voice command from the wireless sound device that performs only audio connection.

In addition, in a case where there are a plurality of wireless sound devices that perform only audio connection without voice connection among a plurality of wireless sound devices, when the processor 430 receives a voice transmission request from the plurality of wireless sound devices that perform only audio connection, the processor 430 may activate a remote voice recognition function, may give priority to the wireless sound device that makes the fastest voice transmission request among the plurality of wireless sound devices that perform only audio connection, and may first recognize and process a remote voice command of the wireless sound device to which priority is given.

The processor 430 may block the reception of the remote voice commands for other wireless sound devices until the processing of the remote voice commands for the wireless sound device to which priority is given is completed.

As described above, according to the present disclosure, it is possible to process a plurality of voice commands requested from a plurality of wireless sound devices by identifying the plurality of wireless sound devices based on addresses for the plurality of wireless sound devices and determining a voice command processing sequence for the plurality of wireless sound devices based on a voice transmission request order, thereby providing user convenience.

In addition, according to the present disclosure, it is possible to process voice commands for a plurality of wireless sound devices supporting both Bluetooth Basic Rate/Enhanced Data Rate Advanced Audio Distribution Profile (BT BR/EDR A2DP) and Bluetooth Low Energy Human Interface Device (BLE HID) Profile. In addition, it is possible to process voice commands for a plurality of wireless sound devices supporting only BT BR/EDR A2DP. In addition, it is possible to process a voice command for a wireless sound device supporting both BT BR/EDR A2DP and BLE HID profile and a voice command for a wireless sound device supporting only BT BR/EDR A2DP.

That is, according to the present disclosure, it is possible to process voice commands for wireless sound devices of different models as well as wireless sound devices of the same model.

Figure 8:
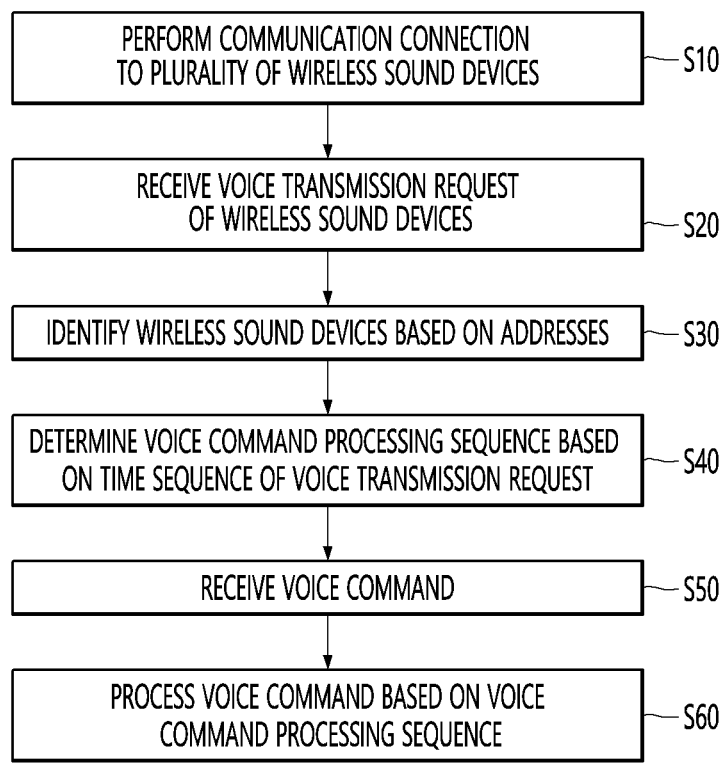
FIG. 8 is a flowchart for describing an operating method of a display device according to an embodiment of the present disclosure.

FIG. 8 is a flowchart for describing an operating method of a display device according to an embodiment of the present disclosure.

As illustrated in FIG. 8, according to the present disclosure, communication connection to a plurality of wireless sound devices may be performed (S10).

According to the present disclosure, a wireless sound device may be searched for through a first communication. Audio connection to the wireless sound device found through the first communication may be performed. A wireless sound device may be searched for through a second communication. Whether the wireless sound device found through the second communication is an audio-connected wireless sound device may be confirmed. When the found wireless sound device is an audio-connected wireless sound device, voice connection to the audio-connected wireless sound device may be performed through the second communication.

For example, the first communication may include Bluetooth communication, and the second communication may include Bluetooth Low Energy (BLE) communication. However, this is only an example and the present disclosure is not limited thereto.

In addition, when the voice connection to the audio-connected wireless sound voice is completed, a guide message indicating that voice command control is possible may be provided.

According to the present disclosure, a voice transmission request may be received from a plurality of wireless sound devices (S20).

According to the present disclosure, a voice transmission request including a voice key code packet may be received from the wireless sound device.

For example, the wireless sound device may transmit a voice transmission request to a display device through a user input of touching the wireless sound device.

Next, according to the present disclosure, the wireless sound device may be identified based on an address of the wireless sound device (S30).

According to the present disclosure, the wireless sound device may be identified based on the address and device manager information of the wireless sound device, and a voice reception response including a voice start packet may be transmitted to the wireless sound device requesting voice transmission.

As an example, according to the present disclosure, the wireless sound device may be identified based on a BT address (Bluetooth address) and device manager information (Hidraw index) of the wireless sound device.

Next, according to the present disclosure, a voice command processing sequence for a plurality of wireless sound devices may be determined based on a time sequence of the voice transmission request (S40).

According to the present disclosure, priority may be given to the wireless sound device that make the fastest voice transmission request among the plurality of wireless sound devices, and the voice command processing sequence may be determined so that the voice command of the wireless sound device to which priority is given is processed first.

As an example, according to the present disclosure, priority may be given to a wireless sound device that first transmits a voice transmission request through a user input of touching the wireless sound device.

According to the present disclosure, a voice command may be received from a plurality of wireless sound devices (S50).

Next, according to the present disclosure, the voice command may be processed based on the voice command processing sequence (S60).

According to the present disclosure, the reception of the voice commands for other wireless sound devices may be blocked until the processing of the voice command for the wireless sound device to which priority is given is completed.

In addition, according to the present disclosure, when the voice command of the wireless sound device to which priority is given is not recognized, a voice re-utterance request may be transmitted to the wireless sound device to which priority is given, and the reception of voice commands for other wireless sound devices may be blocked.

In addition, according to the present disclosure, a voice command processing result for the wireless sound device to which priority is given may be provided, and when list information is included in the voice command processing result, the reception of voice commands for the wireless sound devices other than the wireless sound device to which priority is given may be activated.

That is, according to the present disclosure, a first voice command of the wireless sound device to which priority is given may be processed, and a first voice command processing result may be provided. When list information is included in the voice command processing result, a second voice command of other wireless sound devices may be received and processed to provide a second command processing result.

In addition, according to the present disclosure, in a case where audio connection and voice connection to a first wireless sound device among a plurality of wireless sound devices are performed and audio connection to a second wireless sound device is performed without voice connection, when a voice transmission request is received from the second wireless sound device, a remote voice recognition function may be activated and the remote voice command of the second wireless sound device may be recognized and processed.

According to the present disclosure, when only audio connection to the second wireless sound device is performed without voice connection, a guide message indicating that remote voice command control is possible may be provided.

Figure 9:
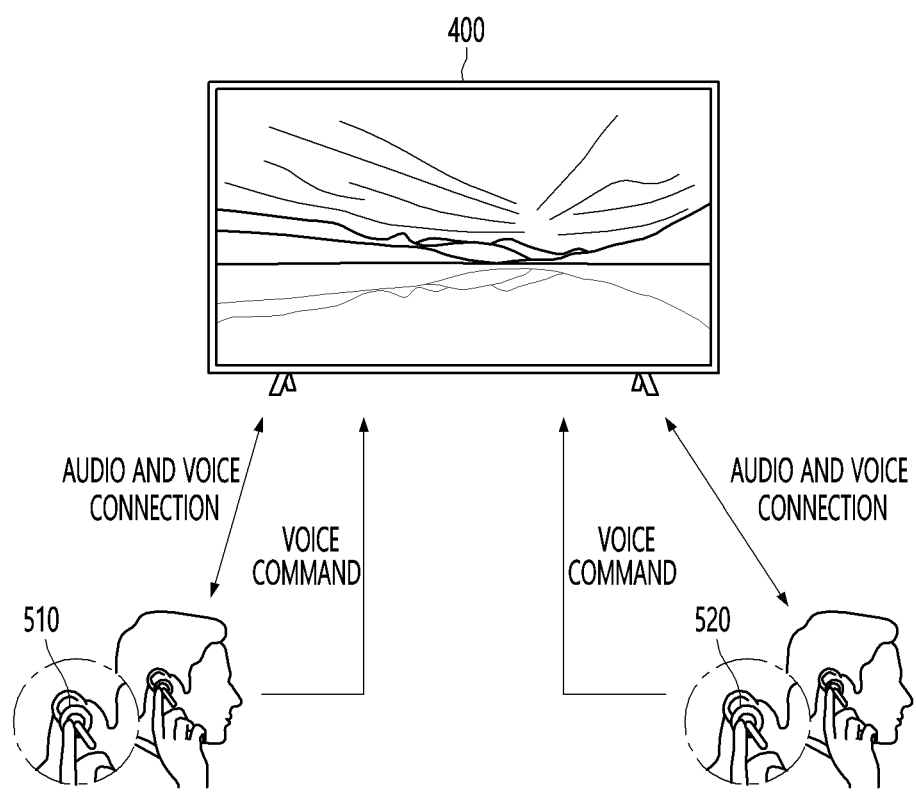
FIGS. 9 and 10 are diagrams for describing a first operation of a display device connected to a plurality of wireless sound devices according to an embodiment of the present disclosure.
Figure 10:
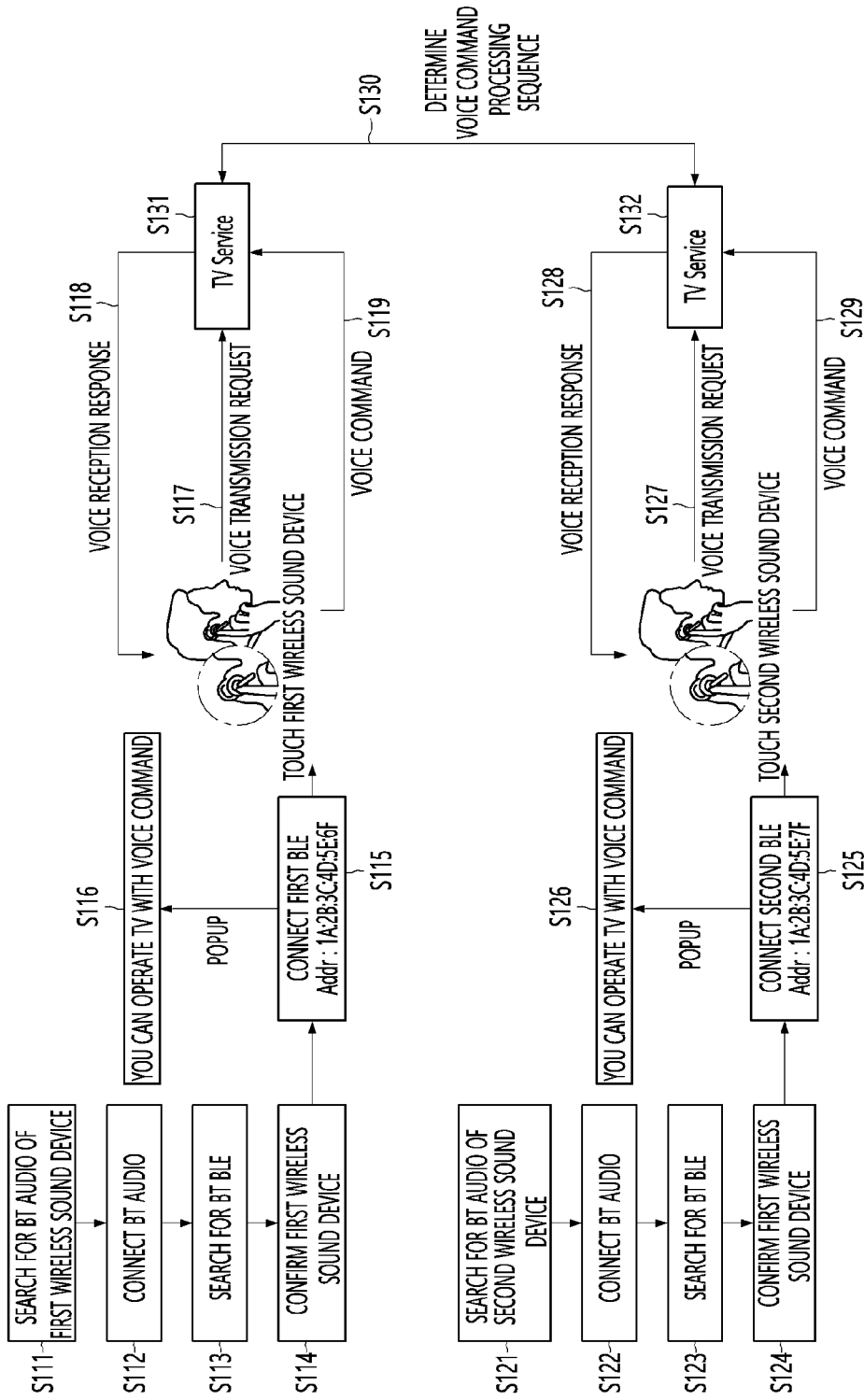

FIGS. 9 and 10 are diagrams for describing a first operation of a display device connected to a plurality of wireless sound devices according to an embodiment of the present disclosure.

FIGS. 9 and 10 are diagrams for describing a first voice processing operation that is performed when a display device 400 is audio-connected and voice-connected to first and second wireless sound devices 510 and 520.

As illustrated in FIGS. 9 and 10, according to the present disclosure, the first wireless sound device 510 may be searched for through Bluetooth communication (S111), and audio connection to the first wireless sound device 510 found through Bluetooth may be performed (S112).

According to the present disclosure, the first wireless sound device 510 may be searched for through BLE communication (S113), and whether the first wireless sound device 510 found through BLE communication is the audio-connected first wireless sound device may be confirmed (S114).

Next, according to the present disclosure, when the first wireless sound device 510 found through BLE communication is the audio-connected first wireless sound device 510, voice connection to the audio-connected first wireless sound device 510 may be performed through BLE communication (S115).

As an example, according to the present disclosure, when voice connection to the first wireless sound device 510 is performed, addresses 1A:2B:3C:4D:5E:6F of the first wireless sound device 510 may be recognized.

Next, according to the present disclosure, when voice connection to the audio-connected first wireless sound device 510 is completed, a guide message indicating that voice command control is possible may be provided (S116).

As an example, according to the present disclosure, a guide message "You can operate the TV with a voice command" may be generated and provided.

According to the present disclosure, the guide message may be processed into at least one of text data, audio data, and image data, and the processed data may be provided. The guide message processed into text data, audio data and image data may be displayed on the display screen of the display device 400, and the guide message processed into voice data may be transmitted to the first wireless sound device 510.

The first wireless sound device 510 may transmit a voice transmission request to the display device 400 through a user input of touching the first wireless sound device 510 (S117).

For example, according to the present disclosure, a voice transmission request including a voice key code packet may be received from the first wireless sound device 510.

Next, according to the present disclosure, the first wireless sound device 510 may be identified based on the address and device manager information of the first wireless sound device 510, and a voice reception response including a voice start packet may be transmitted to the first wireless sound device 510 requesting voice transmission (S118).

As an example, according to the present disclosure, the first wireless sound device 510 may be identified based on a BT address including 1A:2B:3C:4D:5E:6F of the wireless sound device and device manager information including a Hidraw1 index.

On the other hand, according to the present disclosure, the second wireless sound device 520 may be searched for through Bluetooth communication (S121), and audio connection to the second wireless sound device 520 found through Bluetooth may be performed (S122).

According to the present disclosure, the second wireless sound device 520 may be searched for through BLE communication (S123), and whether the second wireless sound device 520 found through BLE communication is the audio-connected second wireless sound device may be confirmed (S124).

Next, according to the present disclosure, when the second wireless sound device 520 found through BLE communication is the audio-connected second wireless sound device 520, voice connection to the audio-connected second wireless sound device 520 may be performed through BLE communication (S125).

As an example, according to the present disclosure, when voice connection to the second wireless sound device 520 is performed, addresses 1A:2B:3C:4D:5E:7F of the second wireless sound device 520 may be recognized.

Next, according to the present disclosure, when voice connection to the audio-connected second wireless sound device 520 is completed, a guide message indicating that voice command control is possible may be provided (S126).

As an example, according to the present disclosure, a guide message "You can operate the TV even with the voice command of the second wireless sound device" may be generated and provided.

According to the present disclosure, the guide message may be processed into at least one of text data, audio data, and image data, and the processed data may be provided. The guide message processed into text data, audio data and image data may be displayed on the display screen of the display device 400, and the guide message processed into voice data may be transmitted to the second wireless sound device 520.

The second wireless sound device 520 may transmit a voice transmission request to the display device 400 through a user input of touching the second wireless sound device 520 (S127).

For example, according to the present disclosure, a voice transmission request including a voice key code packet may be received from the second wireless sound device 520.

Next, according to the present disclosure, the second wireless sound device 520 may be identified based on the address and device manager information of the second wireless sound device 520, and a voice reception response including a voice start packet may be transmitted to the second wireless sound device 520 requesting voice transmission (S128).

As an example, according to the present disclosure, the second wireless sound device 520 may be identified based on a BT address including 1A:2B:3C:4D:5E:7F of the wireless sound device and device manager information including a Hidraw2 index.

Next, according to the present disclosure, a voice command processing sequence for the first and second wireless sound devices 510 and 520 may be determined based on a time sequence of the voice transmission request (S130).

According to the present disclosure, priority may be given to the first wireless sound device 510 that make the fastest voice transmission request among the first and second wireless sound devices 510 and 520, and the voice command processing sequence may be determined so that the voice command of the first wireless sound device 510 to which priority is given is processed first.

According to the present disclosure, a voice command may be received from the first wireless sound device 510 (S119), and a TV service for processing the voice command according to the voice command processing sequence may be provided (S131).

According to the present disclosure, the reception of the voice command for the second wireless sound device 520 may be blocked until the processing of the voice command for the first wireless sound device to which priority is given is completed.

Next, according to the present disclosure, when the voice command processing for the first wireless sound device 510 to which priority is given is completed, a voice command may be received from the second wireless sound device 520 (S129), and a TV service for processing the voice command accordingly may be provided (S132).

As described above, according to the present disclosure, when both audio connection and voice connection are made to the first and second wireless sound devices 510 and 520, a voice command processing sequence may be determined based on a voice transmission request order, and a voice processing operation for a plurality of wireless sound devices may be sequentially performed.

Figure 11:
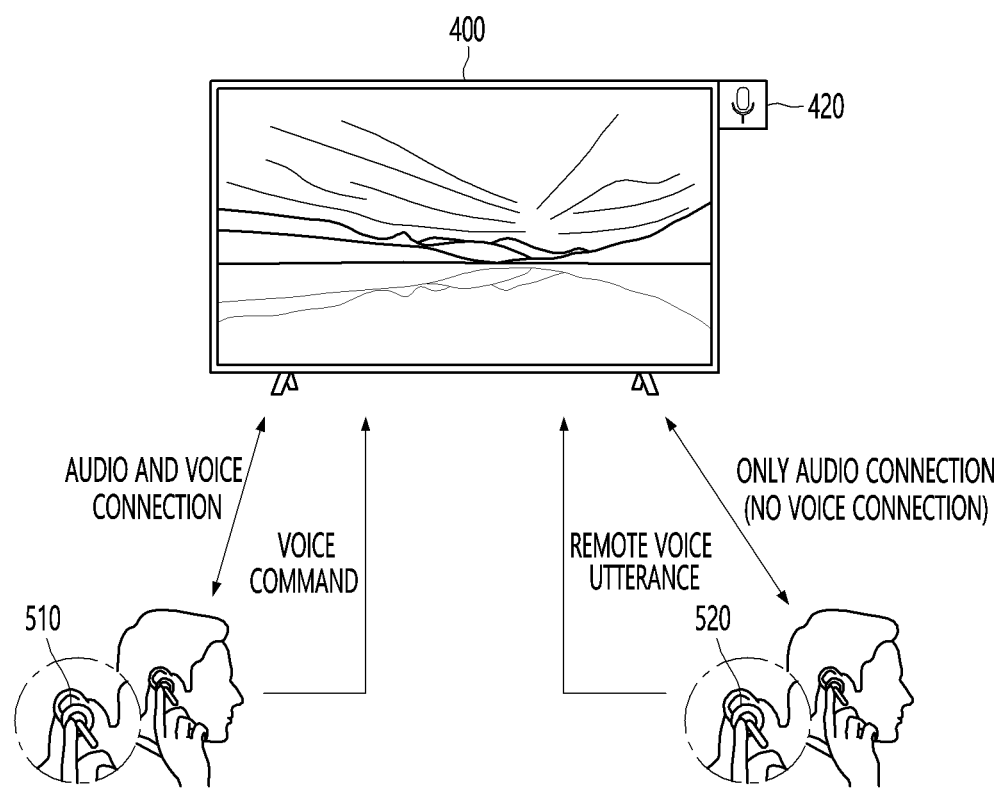
FIGS. 11 and 12 are diagrams for describing a second operation of a display device connected to a plurality of wireless sound devices according to an embodiment of the present disclosure.
Figure 12:
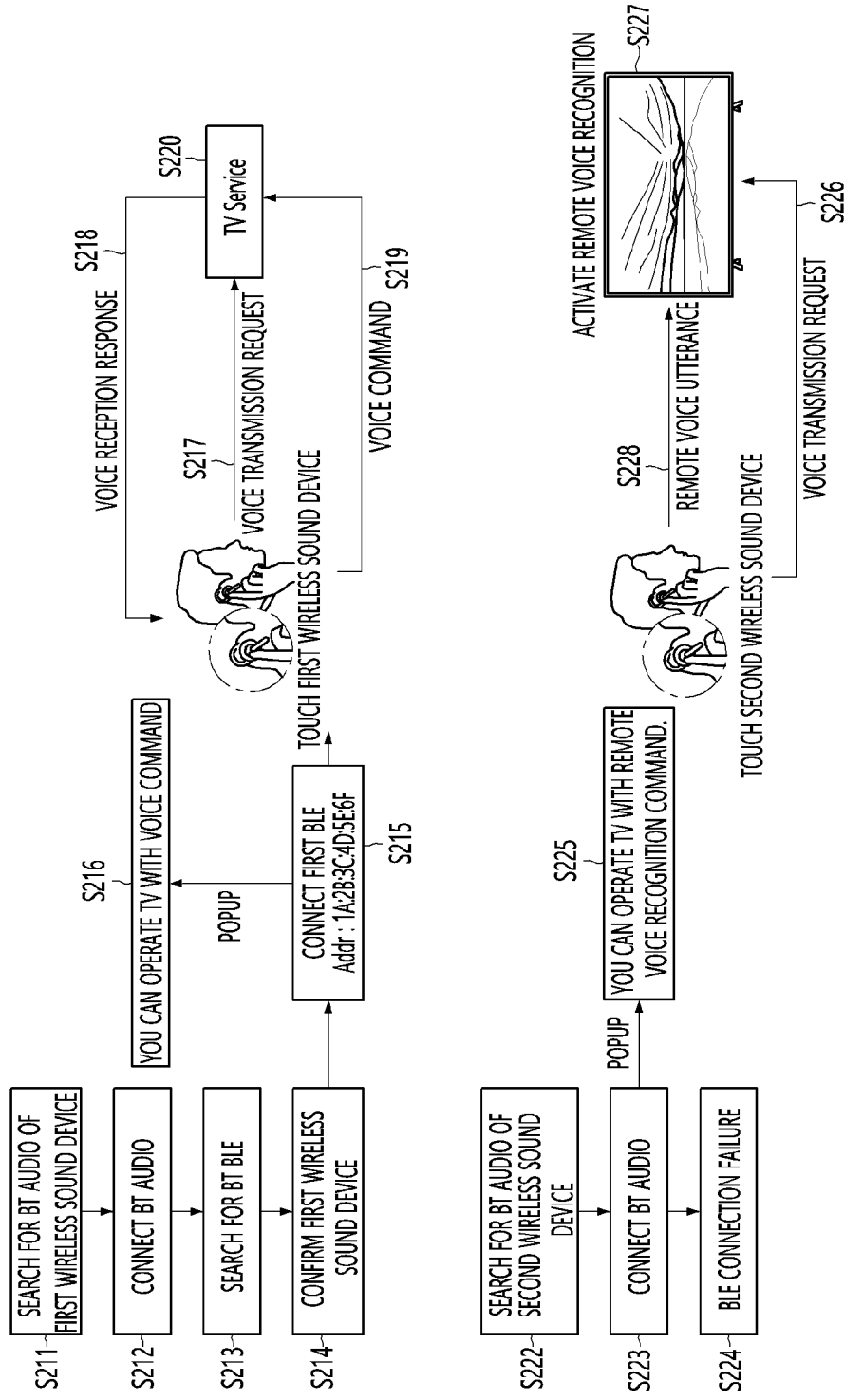

FIGS. 11 and 12 are diagrams for describing a second operation of a display device connected to a plurality of wireless sound devices according to an embodiment of the present disclosure.

FIGS. 11 and 12 are diagrams for describing a second voice processing operation that is performed when the display device 400 is audio-connected and voice-connected to a first wireless sound device 510, is audio-connected to a second wireless sound device 520, and is not voice-connected to the second wireless sound device 520.

As illustrated in FIGS. 11 and 12, according to the present disclosure, the first wireless sound device 510 may be searched for through Bluetooth communication (S211), and audio connection to the first wireless sound device 510 found through Bluetooth may be performed (S212).

According to the present disclosure, the first wireless sound device 510 may be searched for through BLE communication (S213), and whether the first wireless sound device 510 found through BLE communication is the audio-connected first wireless sound device may be confirmed (S214).

Next, according to the present disclosure, when the first wireless sound device 510 found through BLE communication is the audio-connected first wireless sound device 510, voice connection to the audio-connected first wireless sound device 510 may be performed through BLE communication (S215).

Next, according to the present disclosure, when voice connection to the audio-connected first wireless sound device 510 is completed, a guide message indicating that voice command control is possible may be provided (S216).

The first wireless sound device 510 may transmit a voice transmission request to the display device 400 through a user input of touching the first wireless sound device 510 (S217).

Next, according to the present disclosure, the first wireless sound device 510 may be identified based on the address and device manager information of the first wireless sound device 510, and a voice reception response may be transmitted to the first wireless sound device 510 requesting voice transmission (S218).

According to the present disclosure, a voice command may be received from the first wireless sound device 510 (S219), and a TV service for processing the voice command may be provided (S220).

On the other hand, according to the present disclosure, the second wireless sound device 520 may be searched for through Bluetooth communication (S222), and audio connection to the second wireless sound device 520 found through Bluetooth may be performed (S223).

According to the present disclosure, voice connection is not performed due to a BLE connection failure with the second wireless sound device 520 (S224).

Next, according to the present disclosure, when voice connection to the second wireless sound device 520 is completed, a guide message indicating that remote voice command control is possible may be provided (S225).

As an example, according to the present disclosure, a guide message "You can operate the TV even with the remote voice recognition command of the second wireless sound device" may be generated and provided.

The second wireless sound device 520 may transmit a voice transmission request to the display device 400 through a user input of touching the second wireless sound device 520 (S226).

Next, according to the present disclosure, when a voice transmission request is received from the second wireless sound device 520, a remote voice recognition function may be activated (S227).

Next, according to the present disclosure, a remote voice utterance of a user may be received through the voice acquisition unit 420 of the display device 400 (S228).

In addition, according to the present disclosure, a TV service for processing a voice command in response to the remote voice utterance of the user wearing the second wireless sound device 520 may be provided.

As described above, according to the present disclosure, when audio and voice are connected to the first wireless sound device 510 and only audio is connected to the second wireless sound device 520 and voice is not connected thereto, the voice processing operation of the first wireless sound device 510 may be performed and the remote voice recognition function may be activated to perform the voice processing operation of the user wearing the second wireless sound device 520.

Figure 13:
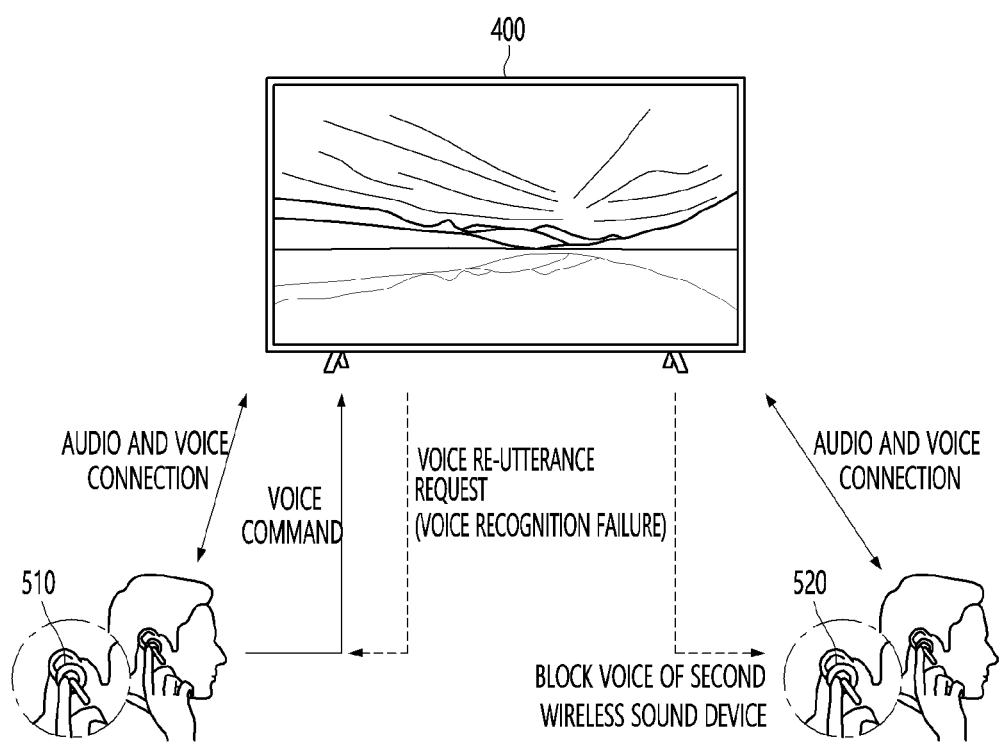
FIGS. 13 and 14 are diagrams for describing a third operation of a display device connected to a plurality of wireless sound devices according to an embodiment of the present disclosure.
Figure 14:
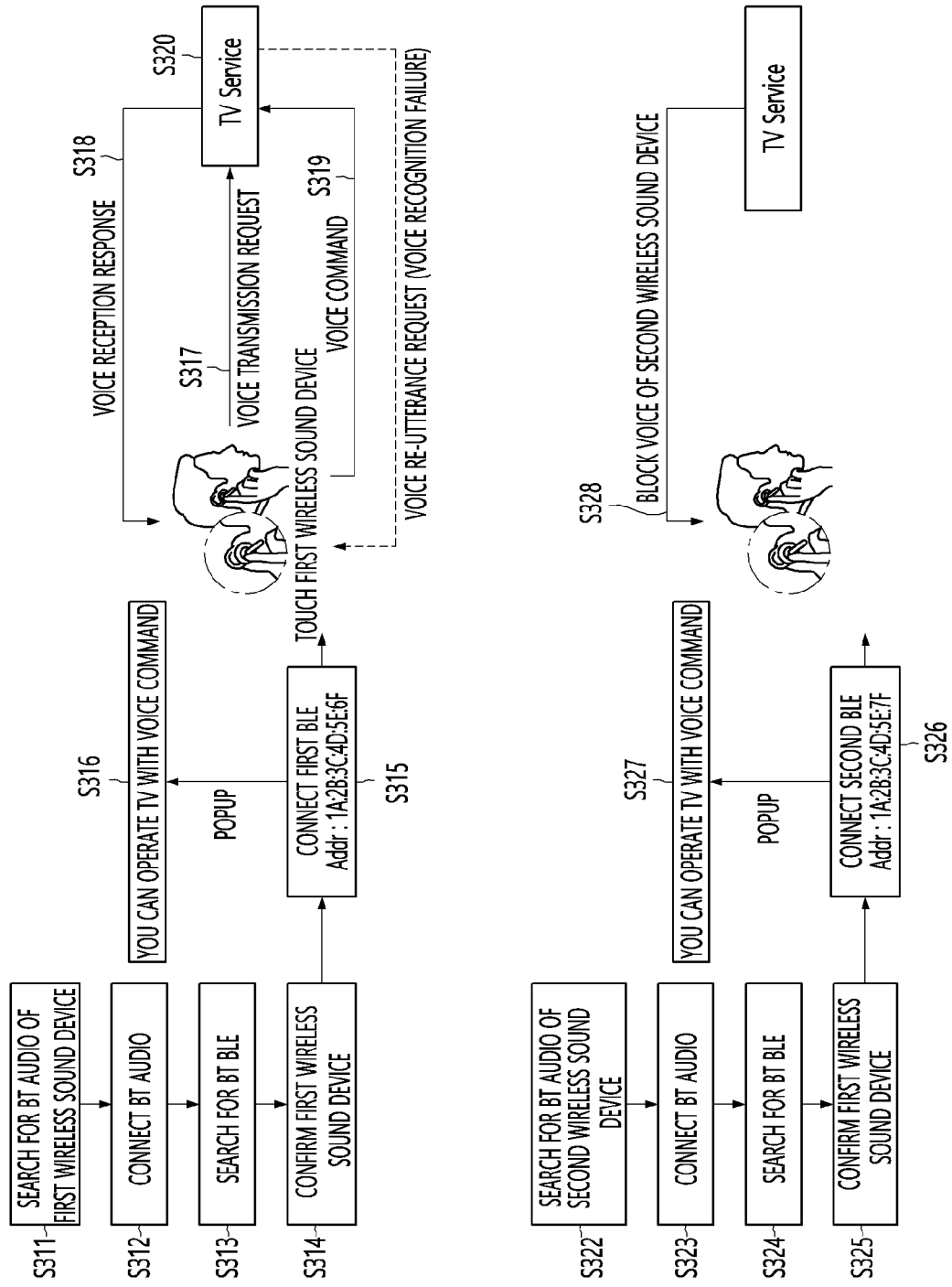

FIGS. 13 and 14 are diagrams for describing a third operation of a display device connected to a plurality of wireless sound devices according to an embodiment of the present disclosure.

FIGS. 13 and 14 are diagrams for describing a third voice processing operation that is performed when voice utterance of the first wireless sound device 510 fails in a state in which the display device 400 is audio-connected and voice-connected to the first and second wireless sound devices 510 and 520.

As illustrated in FIGS. 13 and 14, according to the present disclosure, the first wireless sound device 510 may be searched for through Bluetooth communication (S311), and audio connection to the first wireless sound device 510 found through Bluetooth may be performed (S312).

According to the present disclosure, the first wireless sound device 510 may be searched for through BLE communication (S313), and whether the first wireless sound device 510 found through BLE communication is the audio-connected first wireless sound device may be confirmed (S314).

Next, according to the present disclosure, when the first wireless sound device 510 found through BLE communication is the audio-connected first wireless sound device 510, voice connection to the audio-connected first wireless sound device 510 may be performed through BLE communication (S315).

Next, according to the present disclosure, when voice connection to the audio-connected first wireless sound device 510 is completed, a guide message indicating that voice command control is possible may be provided (S316).

The first wireless sound device 510 may transmit a voice transmission request to the display device 400 through a user input of touching the first wireless sound device 510 (S317).

Next, according to the present disclosure, the first wireless sound device 510 may be identified based on the address and device manager information of the first wireless sound device 510, and a voice reception response may be transmitted to the first wireless sound device 510 requesting voice transmission (S318).

On the other hand, according to the present disclosure, the second wireless sound device 520 may be searched for through Bluetooth communication (S322), and audio connection to the second wireless sound device 520 found through Bluetooth may be performed (S323).

According to the present disclosure, the second wireless sound device 520 may be searched for through BLE communication (S324), and whether the second wireless sound device 520 found through BLE communication is the audio-connected second wireless sound device may be confirmed (S325).

Next, according to the present disclosure, when the second wireless sound device 520 found through BLE communication is the audio-connected second wireless sound device 520, voice connection to the audio-connected second wireless sound device 520 may be performed through BLE communication (S326).

Next, according to the present disclosure, when voice connection to the audio-connected second wireless sound device 520 is completed, a guide message indicating that voice command control is possible may be provided (S327).

The second wireless sound device 520 may transmit a voice transmission request to the display device 400 through a user input of touching the second wireless sound device 520.

Next, according to the present disclosure, a voice command processing sequence for the first and second wireless sound devices 510 and 520 may be determined based on a time sequence of the voice transmission request (S130).

According to the present disclosure, priority may be given to the first wireless sound device 510 that make the fastest voice transmission request among the first and second wireless sound devices 510 and 520, and the voice command processing sequence may be determined so that the voice command of the first wireless sound device 510 to which priority is given is processed first.

According to the present disclosure, a voice command may be received from the first wireless sound device 510 (S319).

According to the present disclosure, when the voice command of the first wireless sound device 510 is unrecognized, a voice re-utterance request may be transmitted to the first wireless sound device 510 to which priority is given, and the reception of a voice command for the second wireless sound device 520 may be blocked (S328).

That is, according to the present disclosure, priority for re-utterance of the first wireless sound device 510 to which priority is given may be maintained, and the reception of the voice command for the second wireless sound device 520 may be blocked until the voice command processing for the re-utterance of the first wireless sound device 510 is completed.

According to the present disclosure, when the re-utterance is received from the first wireless sound device 510, a TV service for processing a voice command accordingly may be provided (S320).

Next, according to the present disclosure, when the voice command processing for the first wireless sound device 510 to which priority is given is completed, a voice command may be received from the second wireless sound device 520, and a TV service for processing the voice command accordingly may be provided.

As described above, according to the present disclosure, when the voice utterance of the first wireless sound device 510 to which priority is given fails in a state in which both audio connection and voice connection are made to the first and second wireless sound devices 510 and 520, the priority of the first wireless sound device 510 may be maintained for re-utterance, the voice of the second wireless sound device 520 may be blocked until the voice processing operation of the first wireless sound device 510 is completed, and when the voice processing operation of the first wireless sound device 510 is completed, the voice processing operation corresponding to the voice command of the second wireless sound device 520 may be sequentially performed.

Figure 15:
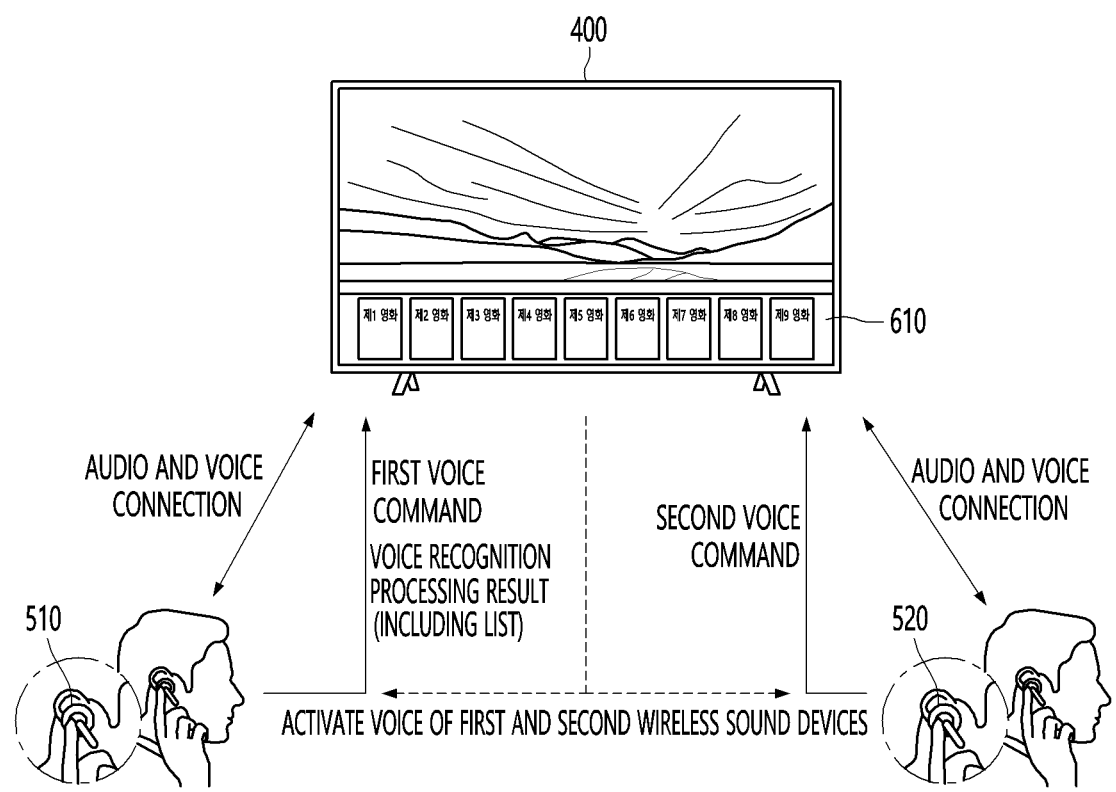
FIGS. 15 and 16 are diagrams for describing a fourth operation of a display device connected to a plurality of wireless sound devices according to an embodiment of the present disclosure.
Figure 16:
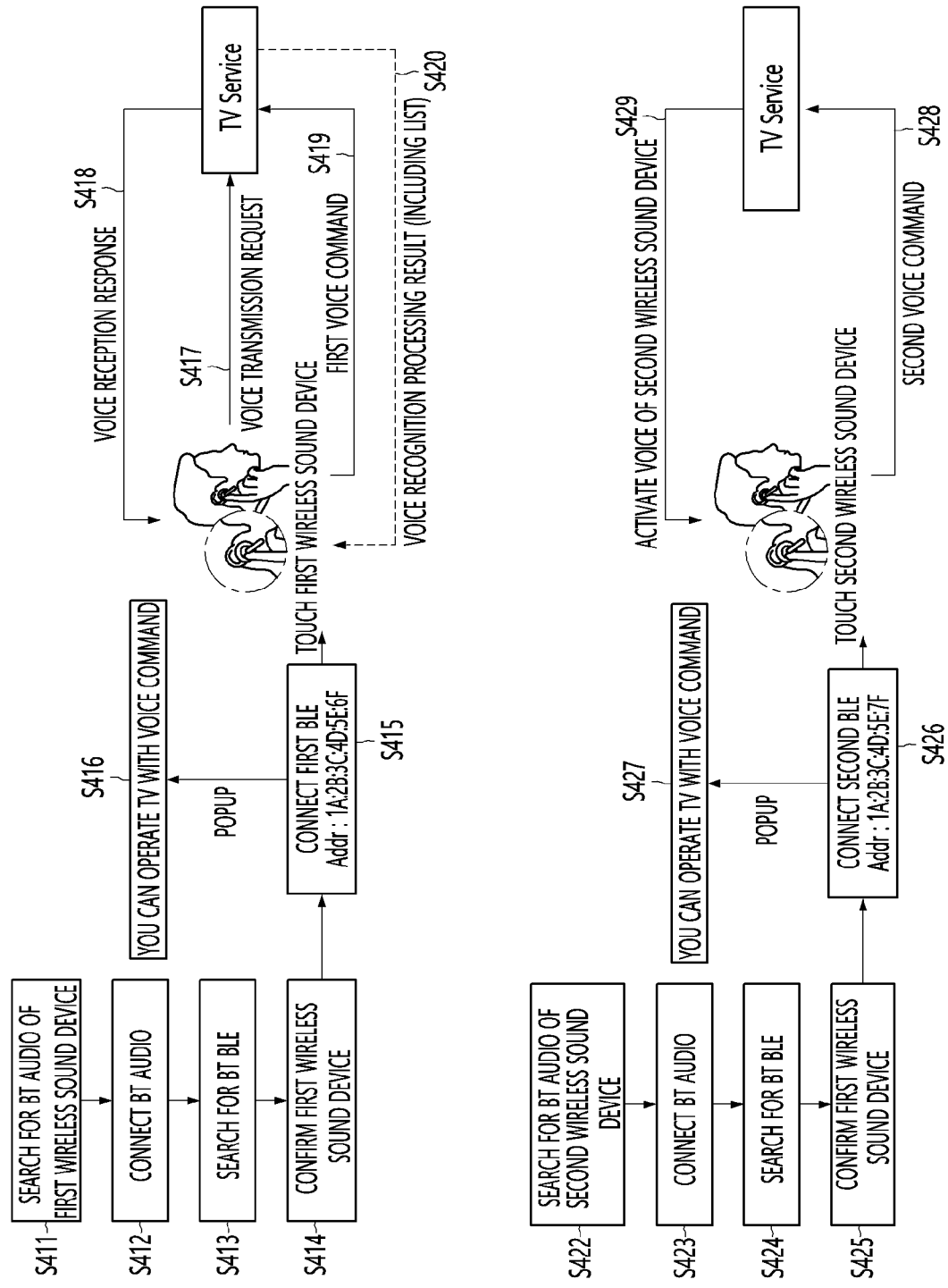

FIGS. 15 and 16 are diagrams for describing a fourth operation of a display device connected to a plurality of wireless sound devices according to an embodiment of the present disclosure.

FIGS. 15 and 16 are diagrams for describing a fourth voice processing operation that is performed when the display device 400 is audio-connected and voice-connected to the first and second wireless sound devices 510 and 520 and list information is included in the voice recognition processing result.

As illustrated in FIGS. 15 and 16, according to the present disclosure, the first wireless sound device 510 may be searched for through Bluetooth communication (S411), and audio connection to the first wireless sound device 510 found through Bluetooth may be performed (S412).

According to the present disclosure, the first wireless sound device 510 may be searched for through BLE communication (S413), and whether the first wireless sound device 510 found through BLE communication is the audio-connected first wireless sound device may be confirmed (S414).

Next, according to the present disclosure, when the first wireless sound device 510 found through BLE communication is the audio-connected first wireless sound device 510, voice connection to the audio-connected first wireless sound device 510 may be performed through BLE communication (S415).

Next, according to the present disclosure, when voice connection to the audio-connected first wireless sound device 510 is completed, a guide message indicating that voice command control is possible may be provided (S416).

The first wireless sound device 510 may transmit a voice transmission request to the display device 400 through a user input of touching the first wireless sound device 510 (S417).

Next, according to the present disclosure, the first wireless sound device 510 may be identified based on the address and device manager information of the first wireless sound device 510, and a voice reception response may be transmitted to the first wireless sound device 510 requesting voice transmission (S418).

On the other hand, according to the present disclosure, the second wireless sound device 520 may be searched for through Bluetooth communication (S422), and audio connection to the second wireless sound device 520 found through Bluetooth may be performed (S423).

According to the present disclosure, the second wireless sound device 520 may be searched for through BLE communication (S424), and whether the second wireless sound device 520 found through BLE communication is the audio-connected second wireless sound device may be confirmed (S425).

Next, according to the present disclosure, when the second wireless sound device 520 found through BLE communication is the audio-connected second wireless sound device 520, voice connection to the audio-connected second wireless sound device 520 may be performed through BLE communication (S426).

Next, according to the present disclosure, when voice connection to the audio-connected second wireless sound device 520 is completed, a guide message indicating that voice command control is possible may be provided (S427).

The second wireless sound device 520 may transmit a voice transmission request to the display device 400 through a user input of touching the second wireless sound device 520.

Next, according to the present disclosure, a voice command processing sequence for the first and second wireless sound devices 510 and 520 may be determined based on a time sequence of the voice transmission request (S130).

According to the present disclosure, priority may be given to the first wireless sound device 510 that make the fastest voice transmission request among the first and second wireless sound devices 510 and 520, and the voice command processing sequence may be determined so that the voice command of the first wireless sound device 510 to which priority is given is processed first.

According to the present disclosure, a voice command may be received from the first wireless sound device 510 (S319).

According to the present disclosure, a voice command processing result for the first wireless sound device 510 to which priority is given may be provided, and when list information 610 is included in the voice command processing result, the reception of a voice command for the second wireless sound device 520 may be activated (S429).

That is, according to the present disclosure, a first voice command of the wireless sound device to which priority is given may be processed, and a first voice command processing result may be provided. When the list information 610 is included in the voice command processing result, a second voice command of the second wireless sound device 520 may be received (S428), and the second voice command may be processed to provide a second command processing result.

For example, according to the present disclosure, when the first voice command of the first wireless sound device 510 is "Find movies in which Angelina Jolie appears", the first command processing result including a list of movies corresponding thereto may be provided.

According to the present disclosure, when it is recognized that the list of movies is included in the first command processing result, the second voice command of the second wireless sound device 520 may be received through voice activation of the second wireless sound device 520.

Next, according to the present disclosure, when the second voice command is "third one", a second command processing result of selecting a third movie in the list of movies corresponding to the second voice command may be provided.

As described above, according to the present disclosure, in a case where both audio connection and voice connection are made to the first and second wireless sound devices 510 and 520 and the list information is included in the voice recognition processing result, when the list information 610 is included in the first voice command processing result of the first wireless sound device 510 to which priority is given, the reception of a voice command for the second wireless sound device 520 may be activated, and the second command processing result of the second wireless sound device 520 may also be provided.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. In addition, the computer may include the processor of the AI device.

What is claimed is:

1. A display device, comprising:
    a transceiver; and
    a processor operatively coupled to the transceiver and being configured to:
    control the transceiver to perform a communication connection with each of a plurality of wireless sound devices, which include a first wireless sound device;
    receive a voice transmission request from each of the plurality of wireless sound devices;
    identify each of the plurality of wireless sound devices based on a respective address of the wireless sound devices;
    determine a voice command processing sequence for the plurality of wireless sound devices based on a time sequence of the voice transmission request of the plurality of wireless sound devices;
    process respective voice commands received from each of the plurality of wireless sound devices according to the determined voice command processing sequence; and
    activate a remote voice recognition function, and recognize and process a remote voice command of a second wireless sound device, among the plurality of wireless sound devices, based on a) an audio connection and a voice connection to the first wireless sound device being performed, b) only an audio connection to the second wireless sound device being performed without voice connection, and c) the voice transmission request being received from the second wireless sound device.

2. The display device of claim 1, wherein the communication connection with the plurality of wireless sound devices includes:
    performing an audio connection with each of the wireless sound devices through a respective first communication; and
    performing a voice connection with each of the wireless sound devices through a respective second communication.

3. The display device of claim 2, wherein the processor is further configured to:
    perform the audio connection with each of the wireless sound devices through a respective Bluetooth communication; and
    perform the voice connection with each of the wireless sound devices through a respective Bluetooth Low Energy (BLE) communication.

4. The display device of claim 2, wherein the processor is further configured to:
    provide a guide message to each of the wireless sound devices indicating that voice command control is possible, based on the voice connection with each of the wireless sound devices through the second communication being respectively completed.

5. The display device of claim 1, wherein the processor is further configured to:
    receive, from the first wireless sound device among the plurality of wireless sound devices, the voice transmission request including a voice key code packet; and
    control the transceiver to transmit a voice reception response including a voice start packet to the first wireless sound device, based on the receiving of the voice transmission request.

6. The display device of claim 5, wherein the processor is further configured to:
    identify the first wireless sound device based on an address and device manager information of the first wireless sound device.

7. The display device of claim 1, wherein the processor is further configured to:
    give priority to the first wireless sound device that made a fastest one of the voice transmission request among the plurality of wireless sound devices; and
    determine the voice command processing sequence so that the voice command of the first wireless sound device to which the priority is given is processed first.

8. The display device of claim 7, wherein the processor is further configured to:
    block the receiving of the voice commands for other wireless sound devices, among the plurality of wireless sound devices, until the processing of the voice command for the first wireless sound device to which the priority is given is completed.

9. The display device of claim 7, wherein the processor is further configured to:
    transmit a voice re-utterance request to the first wireless sound device to which the priority is given, based upon the voice command of the first wireless sound device not being recognized; and continue to block the receiving of the voice commands for other wireless sound devices.

10. The display device of claim 7, wherein the processor is further configured to:
provide a voice command processing result for the first wireless sound device; and
activate the receiving of the voice commands for the wireless sound devices, other than the first wireless sound device, based on list information being included in the voice command processing result.

11. The display device of claim 10, wherein the processor is further configured to:
process a voice command for the list information included in the voice command processing result, based on the receiving of the voice commands for the wireless sound devices, other than the first wireless sound device.

12. The display device of claim 1, wherein the processor is further configured to:
provide a guide message indicating that remote voice command control is possible, based on the audio connection to the second wireless sound device being performed without voice connection.

13. The display device of claim 1, wherein the processor is further configured to:
identify the second wireless sound device based on an address and device manager information of the second wireless sound device; and
recognize and process the remote voice command of the second wireless sound device.

14. A method for a display device, the method comprising:
performing a communication connection with each of a plurality of wireless sound devices, which include a first wireless sound device;
receiving a voice transmission request from each of the plurality of wireless sound devices;
identifying each of the plurality of wireless sound devices based on a respective address of the wireless sound devices;
determining a voice command processing sequence for the plurality of wireless sound devices based on a time sequence of the voice transmission request of the plurality of wireless sound devices;
processing respective voice commands received from each of the plurality of wireless sound devices according to the determined voice command processing sequence,
wherein the processing respective voice commands further comprises:
activating a remote voice recognition function, and recognizing and processing a remote voice command of a second wireless sound device, among the plurality of wireless sound devices, based on a) an audio connection and a voice connection to the first wireless sound device being performed, b) only an audio connection to the second wireless sound device being performed without voice connection, and c) the voice transmission request being received from the second wireless sound device.

15. The method of claim 14, further comprising:
performing an audio connection with each of the wireless sound devices through a respective first communication; and
performing a voice connection with each of the wireless sound devices through a respective second communication.

16. The method of claim 15, further comprising:
performing the audio connection with each of the wireless sound devices through a respective Bluetooth communication; and
performing the voice connection with each of the wireless sound devices through a respective Bluetooth Low Energy (BLE) communication.

17. The method of claim 15, further comprising:
providing a guide message to each of the wireless sound devices indicating that voice command control is possible, based on the voice connection with each of the wireless sound devices through the second communication being respectively completed.

18. The method of claim 14, further comprising:
receiving, from a first wireless sound device among the plurality of wireless sound devices, a voice transmission request including a voice key code packet; and
transmitting voice reception response including a voice start packet to the first wireless sound device, based on the receiving of the voice transmission request.

19. The method of claim 18, further comprising:
identifying the first wireless sound device based on an address and device manager information of the first wireless sound device.

* * * * *